(12) United States Patent
Naske et al.

(10) Patent No.: US 7,254,265 B2
(45) Date of Patent: Aug. 7, 2007

(54) METHODS AND SYSTEMS FOR 2D/3D IMAGE CONVERSION AND OPTIMIZATION

(75) Inventors: Rolf-Dieter Naske, Kakenstorf (DE); Steven M. Schwartz, Brooklyn, NY (US); William Hopewell, New Milford, CT (US)

(73) Assignee: NewSight Corporation, New York, NY (US)

( * ) Notice: Subject to any disclaimer, the term of this patent is extended or adjusted under 35 U.S.C. 154(b) by 806 days.

(21) Appl. No.: 10/338,778

(22) Filed: Jan. 8, 2003

(65) Prior Publication Data

US 2003/0128871 A1    Jul. 10, 2003

Related U.S. Application Data

(63) Continuation-in-part of application No. 10/240,556, filed as application No. PCT/EP01/03707 on Apr. 1, 2001.

(30) Foreign Application Priority Data

Apr. 1, 2000    (DE)    ................. 100 16 074

(51) Int. Cl.
  *G06K 9/00*    (2006.01)
(52) U.S. Cl. ...................................... 382/154
(58) Field of Classification Search ................ 382/154; 348/142
  See application file for complete search history.

(56) References Cited

U.S. PATENT DOCUMENTS 4,781,435 A    11/1988    Lippmann et al.
4,925,294 A    5/1990    Geshwind et al.

(Continued)

FOREIGN PATENT DOCUMENTS

DE    3530610    3/1987

(Continued)

OTHER PUBLICATIONS

Huang, T.S.: Image Sequence Analysis, Springer-Verlag, 1981, pp. 311-315, 338, 338.

(Continued)

*Primary Examiner*—Joseph Mancuso
*Assistant Examiner*—Hadi Akhavannik
(74) *Attorney, Agent, or Firm*—Renner, Otto, Boisselle & Sklar, LLP

(57) ABSTRACT

A method that improves compensation for hard cuts and/or vertical motion effects in the conversion of 2D images to 3D images, displays 2D images to one eye and computed images to the other eye. Generating the computed images includes using an approximation variable that represents some relationship between the 2D images, such as the speed of motion across two images. Compensating for the hard cut or vertical motion effect includes temporarily setting the approximation variable to a value that makes the left and right eye images more similar (if identical, displaying a 2D image). The approximation variable can be pre-set to a value based on the speed of motion in a scene to be displayed. A method of displaying images in either 2D or 3D may include converting 3D images to 2D images by displaying images computed from images intended for either the left eye or the right eye.

5 Claims, 9 Drawing Sheets

U.S. PATENT DOCUMENTS

| | | |
|---|---|---|
| 5,510,832 A | 4/1996 | Garcia |
| 5,673,081 A | 9/1997 | Yamashita et al. |
| 5,682,437 A | 10/1997 | Okino et al. |
| 5,717,415 A | 2/1998 | Iue et al. |
| 5,739,844 A | 4/1998 | Kuwano et al. |
| 5,777,666 A | 7/1998 | Tanase et al. |
| 5,808,664 A * | 9/1998 | Yamashita et al. ............ 348/42 |
| 5,953,054 A | 9/1999 | Mercier |
| 5,969,766 A | 10/1999 | Kim |
| 6,108,005 A | 8/2000 | Starks et al. |
| 6,215,516 B1 | 4/2001 | Ma et al. |
| 6,215,590 B1 | 4/2001 | Okano |
| 6,314,211 B1 | 11/2001 | Kim et al. |
| 6,377,625 B1 | 4/2002 | Kim |
| 6,392,689 B1 | 5/2002 | Dolgoff |
| 6,456,432 B1 | 9/2002 | Lazzaro et al. |
| 6,496,598 B1 | 12/2002 | Harman |
| 2002/0122585 A1 | 9/2002 | Swift et al. |
| 2002/0126202 A1 | 9/2002 | Wood et al. |
| 2002/0191841 A1 | 12/2002 | Herman |
| 2004/0037546 A1* | 2/2004 | Nonaka ..................... 396/121 |

FOREIGN PATENT DOCUMENTS

| | | |
|---|---|---|
| EP | 0520179 | 12/1992 |
| EP | 0665697 | 8/1995 |
| EP | 0714077 | 5/1996 |
| WO | WO 9903068 | 1/1999 |
| WO | WO 9912127 | 3/1999 |
| WO | WO 01/76258 | 4/2001 |

OTHER PUBLICATIONS

Matsumoto, Y. et al., Conversion System of Monocular Image Sequence to Stereo Using Motion Parallax, Stereoscopic Displays and Virtual Reality Systems IV, San Jose, CA, USA, Feb. 11-14, 1997, v. 3012, p. 108-115, Proceedings of the SPIE-Int'l, Soc. for Optical Engineering, 1997.

* cited by examiner

1st Sequence of Images
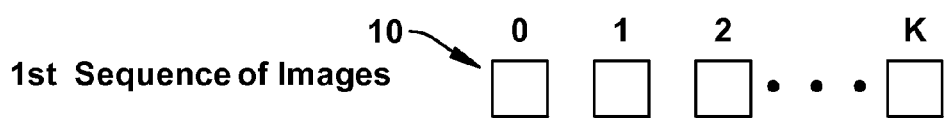
Fig. 1
2nd Sequence of Images Synthesized
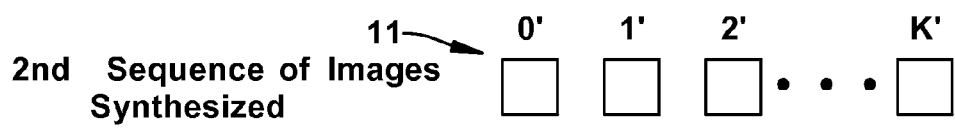
Fig. 2
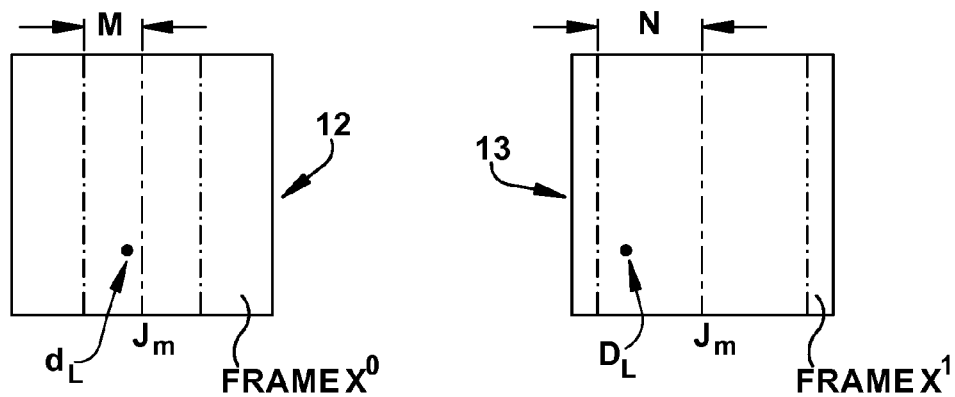
Note that from Frame $X^1$ to Frame $X^0$ the area/point of greatest similarity moved toward the centerline column $J_m$.
Fig. 3
Fig. 4

| | |
|---|---|
| Line 1 | Pixel 1; Pixel 2; Pixel 3; ...etc. |
| Line 2 | - - - |
| Line 3 | Pixel 1; Pixel 2; Pixel 3; ...etc. |
| Line 4 | - - - |
| Line 5 | Pixel 1; Pixel 2; Pixel 3; ...etc. |
| ... | |
| Line Q | Pixel 1; Pixel 2; Pixel 3; ...etc. |
| (Q is an odd number) | |

28

Fig. 6 - ODD FEILD

| | |
|---|---|
| Line 1 | |
| Line 2 | [Pixel 1 (from line 1)+Pixel 1 (from line 3)]/2; [Pixel 2 (from line 1)+Pixel 2 (from line 3)]/2; ...etc. |
| Line 3 | |
| Line 4 | [Pixel 1 (from line 3)+Pixel 1 (from line 5)]/2; [Pixel 2 (from line 3)+Pixel 2 (from line 5)]/2; ...etc. |
| Line 5 | |
| Line 6 | [Pixel 1 (from line 5)+Pixel 1 (from line 7)]/2; [Pixel 2 (from line 5)+Pixel 2 (from line 7)]/2; ...etc. |
| Line 7 | |
| ... | |
| Line Q+1 | [I'm not sure what happens on the last even line.] |

29

Fig. 7 - EVEN FIELD $L^* = L_a - L_b$

METHODS AND SYSTEMS FOR 2D/3D IMAGE CONVERSION AND OPTIMIZATION

This is a continuation-in-part of U.S. patent application Ser. No. 10/240,556, filed Oct. 1, 2002, which is a National Stage of International Application No. PCT/EP01/03707, filed Apr. 1, 2001. The international application was published in the German language.

This application incorporates by this reference the entire disclosures of pending U.S. patent application Ser. No. 10/240,556, filed Oct. 1, 2002, and its predecessors, namely, PCT Patent Application No. PCT/EP01/03707, filed Apr. 1, 2001, and German Patent Application No. 10016074.3, filed Apr. 1, 2000.

This patent application also incorporates by this reference the entire disclosure of PCT Patent Application No. PCT/EP01/13674, filed Nov. 24, 2001.

FIELD OF THE INVENTION

The invention relates to methods and devices for the generation of three-dimensional (referred to as "3D" from this point forward) images, for the generation of 3D images from two-dimensional (referred to as "2D" from this point forward) images, for the generation of 2D images from 3D images, and for improvements to such image generation.

BACKGROUND AND SUMMARY OF THE INVENTION

Three-dimensional imaging is often used to analyze objects, particularly in the fields of medicine and science. Various methods with which television pictures in particular can be produced in three dimensions have also been developed for general consumer applications. Three-dimensional images also are used for entertainment, such as television programs, movies, videos, video games, etc.

Among the methods of 3D imaging, there is a basic distinction between sequential image transmission, in which the images for the right eye and the left eye are transmitted alternately one after the other or saved to a storage medium, and parallel transmission, in which the images are transmitted on two separate channels.

One particular disadvantage of sequential image transmission in connection with conventional television systems is the fact that the refresh rate is reduced to twenty-five images per second for each eye. This creates an unpleasant flickering for the viewer. Of course, this limitation does not occur when the image sequences are each transmitted on their own channel (left or right). However, problems may still arise with synchronizing both channels, as well as with the requirements placed on the receiver, which must be able to receive and process two channels simultaneously. This is not possible for most systems generally available on the market.

Signal transmission and processing likely will be entirely digital in future television systems. In such systems, every image is broken down into individual pixels which are transmitted in digitized format. In order to reduce the bandwidth required for this process, the appropriate compression methods are used; however, these create problems for stereo transmission.

For example, using block coding methods with a reasonable rate of compression, generally it is not possible to reconstruct every individual line of an image precisely. In addition, interframe coding techniques, such as MPEG-2, do not allow transmitting or saving stereo images in a sequential image format, because image information from one image still is contained in another image, creating the so-called "crosstalk effect", which makes clear separation of the right image from the left image difficult or impossible.

Other methods for generating a 3D image sequence from a 2D1 image sequence are disclosed in DE 35 30 610 and EP 0 665697. An autostereoscopic system with an interpolation of images is disclosed in EP 0 520 179, whereas in "Huang: Image Sequence Analysis" (published in Springer Verlag) problems of the recognition of motion areas in image sequences are discussed.

Therefore, one problem addressed by the invention is the creation of a method and a device with which it is possible to generate images that provide a very natural 3D image impression even if using the above-mentioned transmission and/or compression methods.

Several examples are mentioned in which techniques have been used to convert 2D images to 3D images. One conversion technique according to an aspect of the invention is described in detail below. Two-dimension to 3D conversion is advantageous when a given television program, movie, video, video game, or other sequence of images, etc. (hereinbelow collectively referred to as "video" for brevity) has been prepared in a 2D format. Therefore, if a viewer (person) were to obtain a 2D video, e.g., on a DVD (digital video disk), compact disk (CD), video tape, or some other storage medium (hereinbelow collectively referred to as "DVD" for brevity), the individual may be able to view the video in 3D format using a 2D to 3D conversion system.

Sometimes a video may be prepared in both 2D and 3D formats and stored in a DVD for subsequent display in the selected 2D or 3D format, as the viewer may select. From time to time a person viewing a 3D format movie may decide to watch the same in 2D format. This would be possible by switching from the 3D format stored on the DVD to the 2D format stored on the DVD, but the switching may take time because usually it is not possible to switch from one scene in 3D format to the same scene in 2D format; rather it would be necessary to restart the 2D format video and to search for the scene where the 3D format of the video was stopped. Meanwhile, the interest, emotion, suspense or intrigue created by watching the video may be lost while taking the time to make the format switch. Some videos are created and stored only in a 3D format. If such were the case, a viewer would not be able to switch between the 3D format and a 2D format. Accordingly, there is a need to provide such ability to switch from a 3D format movie to a 2D format. There also is a need to improve the versatility of such display systems to allow the receiving of 2D format or 3D format input image data/images and to provide outputs for display of the images represented by the image data in either 2D or 3D format.

The term "hard cut" is a term frequently used in the video field to indicate that an image of one scene very quickly switches to another scene. For example, one scene may be of a person sitting at a table while eating, and the next scene may show a view outside the window of the room in which that person is sitting. The two scenes are entirely different. It is possible that a portion of one scene may be included in the other scene, but still there is a substantial difference overall between the two scenes.

In the techniques used for converting 2D format images, e.g., movies, etc., to 3D format images for display, the techniques used may involve a determining of relationship between two images and making the appropriate adjust ments (compensation) to left or right images, for example, so that the viewer perceives a 3D visual effect. However, upon occurrence of a hard cut, the relationship between two sequential scenes may be almost non-existent. Absent such relation, it may be difficult, or impossible, to obtain a conversion to 3D format or at least to a sequence of images that may be comfortably viewed by a viewer. Thus, there is a need to provide hard cut compensation when converting from a 2D format to a 3D format.

The occurrence of a hard cut may disrupt smooth conversion of images from 2D format to 3D format. Such disruption may lead to a less than optimum 3D viewing experience for the viewer. Therefore, there is a need to detect occurrence of hard cuts and to compensate or adjust for the same in a 2D to 3D conversion system.

Vertical motion effect in images, e.g., movies, etc., that are converted from 2D format to 3D format can be somewhat disadvantageous. For example, most depth perception (3D or stereo effect in viewing a scene, for example) is obtained in a generally horizontal plane rather than in a vertical plane because the viewer's eyes are spaced apart usually in a generally horizontal plane and respective views are seen according to the stereo base of the distance between the viewer's two eyes. Vertical motion or disparity between a pair or more than a pair of sequential images of a movie may tend to be construed by 2D to 3D conversion systems as motion indicative of depth, which, of course, may be incorrect.

Accordingly, viewing images with vertical motion in 3D format may present a less than optimal 3D viewing experience for the viewer and also may inaccurately represent the actual depth information. Accordingly, there is a need to detect vertical motion effect and to reduce the same or to eliminate it in systems and methods for converting 2D format image data to 3D format image data and associated images provided therefrom.

Some types of movies, television shows, videos, etc., are more active than others, e.g., greater action, movement, scene changes, etc. For example, a war movie usually would have much more action than a television talk show. If the same 2D to 3D conversion technique, variables, values, etc., were used to convert an action movie as would be used to convert a television talk show from 2D format to 3D format, substantial effect of the 3D images may be lost during at least part of the program. For example, in an action movie there is a great deal of motion and usually a great deal of depth information that can be detected as a result of that motion; therefore, if the conversion from 2D format to 3D format relied on the motion, then substantial depth would be encountered. However, if the same approached were used convert a talk show program from 2D format to 3D format, the depth or 3D effect may be much less than in the action movie or, in any event, it may take much longer for the depth or 3D effect to become evident to a viewer from the 3D format images of the talk show program. Accordingly, there is a need to accommodate the different characteristics of the type of program, e.g., action movie, television talk show program, wildlife video, etc., when converting to 2D format representations thereof to 3D format.

It is noted here that reference may be made to television, video, movie, video game, etc., all of which are obtained by a sequence of images. The sequence of images provide information indicating the characteristic of a given scene at one moment in time and the characteristic of that scene in another moment of time. Reference herein to television, video, movie, video game, etc., may be construed to include all of the same and other formats of information conveyance, e.g., by a sequence of images that are presented for viewing. The viewing may be via a television, a computer monitor, a flat panel display, a projector, glasses or goggles, such as, for example, those used in connection with virtual reality type displays, game displays, etc., which provide images directly to the eyes of a viewer, and so forth. Furthermore, reference herein to images may also include image data, i.e., signals, data, etc., that may be stored, may be transmitted, or may be created, synthesized, interpolated, or otherwise obtained to represent the images. Thus, in the description below, reference to an image may be construed to mean the image itself or the data representing the image, whereby, if that data is appropriately provided to a display device, so the image can be viewed by a viewer (reference to viewer typically would mean a person who would view the image). 2D means two-dimensional images, sometimes referred to as mono, monoscopic, etc. type of images. 3D (sometimes written as 3-D) means three-dimensional images or images that appear to have not only height and width characteristic, but also depth characteristics. Sometimes 3D is referred to as stereo, stereoscopic, etc. type of images. These definitions (and others presented herein) are not intended to be limiting; standard or conventional definitions of the terms used herein also apply.

Another aspect relates to a method for the generation of 3D images represented by 3D image data that includes at least two channels of data for respective left and right eye views from a sequence of 2D images represented by 2D image data, comprising the steps of:

i) assigning the 2D image data to a first channel;

ii) determining a measure of similarity ($\delta_k$) between sets of 2D image data representative of sequential 2D images;

iii) comparing the measure of similarity ($\delta_k$) to predetermined threshold values ($\delta_0 < \delta_1 < \delta_2$) where (1) if $\delta_0 < \delta_k < \delta_2$ and $\delta_k - \delta_{k-1} \leq -\delta_1$ and an approximation variable ($\alpha$) is less than or equal to Ks, the approximation variable is set to $\alpha := \alpha + s$, (2) if $\delta_0 < \delta_k < \delta_2$ and $\delta_k - \delta_{k-1} \geq \delta_1$ and $\alpha \geq s$, the approximation variable ($\alpha$) is set to $\alpha := \alpha - s$, and (3) if $\delta_0 \geq \delta_k$, the approximation variable ($\alpha$) is set to $\alpha := 0$, where the approximation variable ($\alpha$) determines the width of a stereo base, and s denotes a step width;

iv) calculating 3D image data for a second channel from the 2D image data using the approximation variable ($\alpha$); and v) assigning the first channel and the second channel to respective left and right eye views for display.

Another aspect relates to an apparatus for generating 3D images represented by 3D image data that includes at least two channels of data for respective left and right eye views from a sequence of 2D images represented by 2D image data, comprising:

i) means for assigning the 2D image data to a first channel;

ii) means for determining a measure of similarity ($\delta_k$) between sets of 2D image data representative of sequential 2D images;

iii) means for comparing the measure of similarity ($\delta_k$) to predetermined threshold values ($\delta_0 < \delta_1 < \delta_2$) where (1) if $\delta_0 < \delta_k < \delta_2$ and $\delta_k - \delta_{k-1} \leq -\delta_1$ and an approximation variable ($\alpha$) is less than or equal to Ks, the approximation variable is set to $\alpha := \alpha + s$, (2) if $\delta_0 < \delta_k < \delta_2$ and $\delta_k - \delta_{k-1} \geq \delta_1$ and $\alpha \geq s$, the approximation variable ($\alpha$) is set to $\alpha := \alpha - s$, and (3) if $\delta_0 \leq \delta_k$, the approximation variable ($\alpha$) is set to $\alpha := 0$, where the approximation variable ($\alpha$) determines the width of a stereo base, and s denotes a step width;

iv) means for calculating 3D image data for a second channel from the 2D image data using the approximation variable ($\alpha$); and v) means for assigning the first channel and the second channel to respective left and right eye views for display.

Another aspect relates to a system for the generation of 3D images represented by 3D image data that includes at least two channels of data for respective left and right eye views from a sequence of 2D images represented by 2D image data, comprising:

i) means for determining a measure of similarity ($\delta_k$) between sets of 2D image data representative of sequential 2D images;

ii) means for comparing the measure of similarity ($\delta_k$) to predetermined threshold values ($\delta_0 < \delta_1 < \delta_2$) where
  (1) if $\delta_0 < \delta_k < \delta_2$ and $\delta_k - \delta_{k-1} \leq -\delta_1$ and an approximation variable ($\alpha$) is less than or equal to Ks, the approximation variable is set to $\alpha := \alpha + s$,
  (2) if $\delta_0 < \delta_k < \delta_2$ and $\delta_k - \delta_{k-1} \geq \delta_1$ and $\alpha \geq s$, the approximation variable ($\alpha$) is set to $\alpha := \alpha - s$, and
  (3) if $\delta_0 \geq \delta_k$, the approximation variable ($\alpha$) is set to $\alpha := 0$, where the approximation variable ($\alpha$) determines the width of a stereo base, and s denotes a step width;

iii) an image generator for calculating 3D image data for a second channel from the 2D image data using the approximation variable ($\alpha$).

Another aspect relates to a method for generating 3D images, comprising providing a first sequence of images for display, computing a second sequence of images for display from one or more images of the first sequence using an approximation variable representative of a relationship between at least two images of the first sequence, allowing the approximation variable to change in response to a relationship between at least two images of the first sequence, checking for occurrence of a hard cut between images of the first sequence, and in response to occurrence of a hard cut, setting the approximation variable to a value that provides a low degree of parallax between respective images of the first and second sequences of images or the appearance of a 2D image.

Another aspect relates to an apparatus for generating 3D images, comprising means for providing a first sequence of images for display, means for computing a second sequence of images for display from one or more images of the first sequence using an approximation variable representative of a relationship between at least two images of the first sequence and allowing the approximation variable to change in response to a relationship between at least two images of the first sequence, means for checking for occurrence of a hard cut between images of the first sequence, and means operative in response to occurrence of a hard cut for setting the approximation variable to a value that provides a low degree of parallax between respective images of the first and second sequences of images or the appearance of a 2D image.

Another aspect relates to a method of compensating 3D image data in response to hard cut detection, comprising preparing 3D image data for display from a first sequence of images and a second sequence of images computed from at least two respective images of the first sequence by using an approximation variable that changes based on a relationship between at least two images of the first sequence, in response to occurrence of a hard cut in images of the first sequence, setting the approximation variable to a value that provides a low degree of parallax between respective images of the first and second sequences of images or the appearance of a 2D image.

Another aspect relates to an apparatus for compensating 3D image data in response to hard cut detection, comprising means for preparing 3D image data for display from a first sequence of images and a second sequence of images computed from at least two respective images of the first sequence by using an approximation variable that changes based on a relationship between at least two images of the first sequence, means responsive to occurrence of a hard cut in images of the first sequence for setting the approximation variable to a value that provides a low degree of parallax between respective images of the first and second sequences of images or the appearance of a 2D image.

Another aspect relates to a method for generating 3D images, comprising preparing 3D image data from a first sequence of images and a second image sequence of images computed from at least two images of the first sequence using an approximation variable that changes based on a relationship between at least two images of the first sequence, and reducing the value of the approximation variable upon the occurrence of vertical disparity between at least two images of the first sequence.

Another aspect relates to an apparatus for generating 3D images, comprising means for preparing 3D image data from a first sequence of images and a second image sequence of images computed from at least two images of the first sequence using an approximation variable that changes based on a relationship between at least two images of the first sequence, and means for reducing the value of the approximation variable upon the occurrence of vertical disparity between at least two images of the first sequence.

An aspect of the invention relates to a method of converting 3D image data for a 3D image that includes image data representative of respective left and right eye views to 2D image data for a 2D image, comprising
  i) using the 3D image data representative of one of the left and right eye views to provide first image data representative of a 2D image, and
  ii) computing computed image data representative of a subsequent 2D image from the first image data.

Another aspect relates to a device for converting 3D image data, which includes image data representative of respective left and right eye views of a 3D image, to 2D image data, comprising
  i) an output providing the image data that is representative of one of the respective left and right eye views of the 3D image data as 2D output image data for a 2D image, and
  ii) a computation device to compute from said image data representative of said one of said respective left and right eye views computed image data that is representative of a subsequent 2D image.

Another aspect relates to a method of providing images for display, comprising
  i) receiving image data in either of 2D format or 3D format, and
  ii) selectively outputting in either 2D format or 3D format output image data for display, and wherein selectively outputting 2D format output image data from 3D image data includes outputting at least some output image data computed from one eye view of the 3D format image data.

Another aspect relates to a system for use in displaying images, comprising
  i) an input for receiving image data in either of 2D or 3D format,
  ii) a converter to convert 2D image data to 3D image data and to convert 3D image data to 2D image data, and
  iii) a selector operable to select the format of output image data, including 2D output image data in response to 2D input image data, 3D output image data in response to 3D input image data, 2D output image data converted by the converter from 3D input image data, and 3D output image data converted by the converter from 2D input image data.

Another aspect relates to a method for generating 3D images, comprising preparing 3D image data from a first sequence of images and a second sequence of images computed from at least two images of the first sequence using an approximation variable that changes based on a relationship between at least two images of the first sequence, and presetting the initial value of the approximation variable according to the anticipated amount of motion across at least two images of the first sequence.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

Although the invention is shown and described with respect to one or more embodiments, it is to be understood that equivalents and modifications will occur to others skilled in the art upon the reading and understanding of the specification. The present invention includes all such equivalents and modifications, and is limited only by the scope of the claims.

BRIEF DESCRIPTION OF THE DRAWINGS

Additional details, features, and advantages of the invention may be seen from the following description of a preferred embodiment with reference to the annexed drawings. They show:

FIGS. 1 and 2 are schematic illustrations showing respective images or image data—FIG. 1 represents actual images and FIG. 2 represents synthesized images;

FIGS. 3 and 4 are schematic illustrations of images or image frames showing respective image portions or subframes used to determine a similarity value $d_L$;

FIGS. 6 and 7 are schematic illustrations of parts of respective lines of image data (or images) used do demonstrate the method of converting 3D images to 2D images—it is noted here that mentioning of 3D images herein usually indicates that the 3D effect or 3D images are obtained by a sequence of images;

DETAILED DESCRIPTION

Introduction

Figure 5:
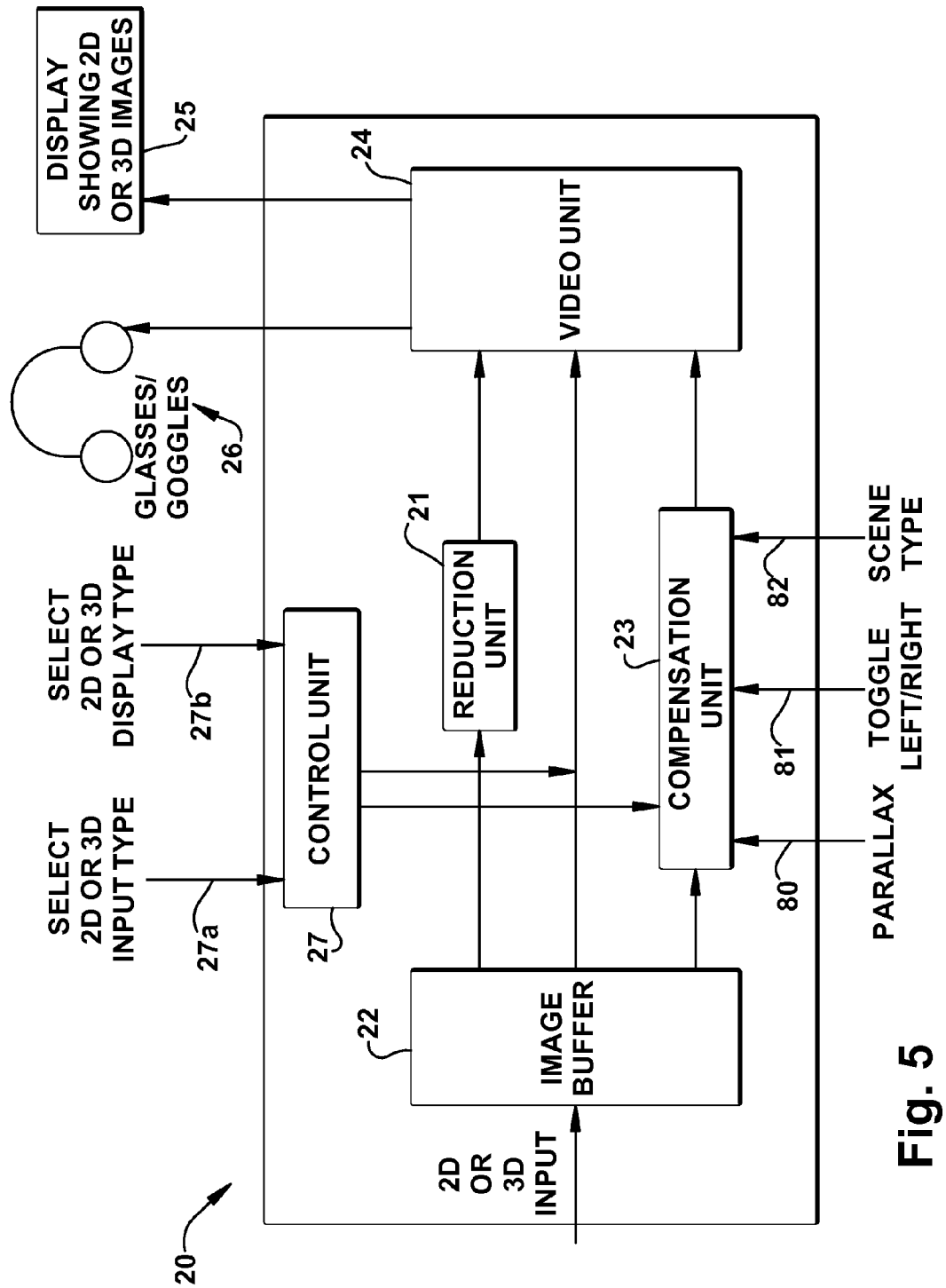
FIG. 5 is a schematic block diagram representing a system in accordance with the invention.

The present invention concerns improvements for converting 2D format movies, videos, televison programs, video games, etc. to 3D (three-dimensional or stereo) format to obtain a 3D effect when observed by a viewer. The invention also concerns converting 3D format movies, videos, television programs, video games, and the like to 2D format.

An example of an approach for converting 2D format movies to 3D format is schematically illustrated in FIGS. 1 and 2 and also is described in greater detail further below in this specification at the section entitled 2D TO 3D CONVERSION USING APPROXIMATION VARIABLE α and in the German patent application and two PCT patent applications identified at the very beginning of this patent application.

Briefly, as is illustrated in FIGS. 1 and 2, there is shown at 10 a first sequence of k images 0, 1, 2, 3 . . . K. The $0^{th}$ image is the one currently being shown/displayed or is ready to be shown/displayed—sometimes referred to as the "native" image; the $1^{th}$ image is the image that was shown/displayed before the $0^{th}$ image; the $2^{th}$ image is the one that was shown/displayed before the $1^{th}$ image, etc. From the first sequence of images the invention prepares a second sequence of k images, which are shown at 11, and are designated 0', 1', 2', . . . K'. The images in the second sequence of images are synthesized from the first sequence of images. Without going into detail on that procedure to synthesize the second sequence of images, which is described in greater detail below, suffice it to say here that each of the images in the second sequence of images is prepared using information from images in the first sequence, e.g., the $0^{th}$ image (the current image), and one or more of the images that preceded it, e.g., the $1^{st}$ image, the $2^{nd}$ image, etc.

The respective sequential images from the first and second sequences are shown on a display and are viewed by a person who is wearing shutter glasses. The shutter glasses are synchronized to open and close, respectively, so that when a given image from the first sequence of images is displayed, the person may see that image using his/her left eye; and when a given image from the second sequence of images is displayed, the person may see that image using his/her right eye. If the images of the respective sequences (for the respective left and right eye viewing) are related such that there is a parallax relation to them, e.g., one is shifted slightly relative to the other, the viewer construes this as depth information and sees the image as a 3D or stereo image.

The invention also may be used in connection with autostereo display systems, which allow viewing of 3D images without the need for the viewer to wear shutter glasses or to use polarizers or some other means to discriminate between left eye and right eye images.

In the description hereof the terms image, frame and field may be used; they are intended to be equivalent—meaning image—unless context indicates otherwise. For example, in the television display techniques, a frame is composed of sequential fields; the present invention does not necessarily have to rely on such a distinction. Rather, the present invention is described as using images (or image data, e.g., signals representing an image) without regard to whether the image is a single field frame, a two field frame, a field itself, or otherwise. Thus, absent an indication by context, the terms image, frame, and field mean the same.

Referring to FIGS. 3 and 4, an example of a process, as was mentioned above, to obtain images of the second sequence, the vertical column $j_m$ that is at the horizontal center of each of the $X^0$ images, e.g., the respective $0^{th}$ images referred to in FIG. 1, that are shown at 12 and the next image, the $X^1$ image, for example, that is shown at 13, are determined, and a horizontal distance or area M in the $X^0$ image and a horizontal distance or area N in the $X^1$ image are determined arbitrarily; therefore, the areas M and N, N greater than or equal to M, are respective sub-image portions of the respective images $X^0$ and $X^1$. Then, the two sub-image portions M and N are searched for the areas of greatest similarity $d_L$ and for the respective locations of those areas of greatest similarity relative to the vertical column (centerline) $j_m$ in each of those respective images $X^0$ and $X^1$. If the area of greatest similarity $d_L$ has moved quite far from one image to the next, this indicates fast motion occurring in the images; conversely, if the area of greatest similarity $d_L$ has moved a small distance, then this indicates slow motion occurring in the images. As is described in greater detail below in the mentioned section, if the motion is less than a predetermined minimum or is nonexistent, then the described process may use the $X^0$ image and an image $X^2$, $X^3$, etc. Preceding the $X^1$ image until adequate motion has been found to allow suitable synthesizing of the next image of the second sequence 11.

Based on finding the areas of greatest similarity $d_L$ and their relative locations in the respective images or sub-portions M and N of the sequential images, an approximation variable alpha is obtained. The two images $X^0$, $X^1$ can be related, compared, etc., to compute image data for a synthesized image with adjustments based on the approximation variable alpha α. The approximation variable alpha α can increase, decrease or stay the same as the relation between areas of greatest similarity move closer or farther from each other in sequential frames. Furthermore, although the above summary concerns use of two sequential images in the first sequence, it is possible that the invention may use from the first sequence of images two or more images that are not sequential, e.g., the native image $X^0$ and an image that was displayed or otherwise preceded the native image 2, 3 or more images ($X^2$, $X^3$, etc.) prior to the native image.

The above summarizes a technique of 2D to 3D conversion that will be described in greater detail in the 2D To 3D Conversion section below.

Conversion of 3D Images to 2D Images and Ability to Display Either 2D or 3D Images Regardless of Whether the Input Signals Represent 2D or 3D Images FIG. 5 is a schematic block diagram of a system 20 of the invention. The system 20 includes a reduction unit 21, which converts a 3D series of images to 2D, as will be explained further below.

The system 20 includes an image buffer 22 that receives either 2D or 3D images in the form of respective signals or data from some source, such as, for example, a DVD, a VHS video tape, a cable TV connection, a satellite connection, a camera, etc. The data from the image buffer 22 is provided to three different systems, as follows:

a) To a conversion unit 23, which is described below.

b) To a video unit 24, which provides output image signals (images) as 2D or 3D format output directly to a display, e.g., a monitor, television, projector, etc. 25, as the image signals are received from the image buffer 22. If the output is 2D, the images can be viewed without shutter glasses. If the output is 3D, the images are viewed on the display 25 via shutter glasses 26 that sequentially open and close in synchronism with the respective left and right eye images being delivered to and shown by the display 25. Therefore, what comes in to the image buffer 22 goes out to the display 25.

c) To the reduction unit 21 that is able to reduce 3D images to 2D images.

A control unit 27 may be operated by a user by pressing respective buttons 27a, 27b to indicate what kind of signal is being received (2D or 3D) and what kind of display is to be provided (2D or 3D). The control unit activates the respective systems a), b) and c) that are mentioned above. The control unit could be a remote control, icons on a display or similar user interface devices.

Turning to the reduction unit 21 that is the component which carries out the 3D to 2D conversion for display of 3D images in 2D format on the display 25:

1. The user knows that 3D images are being received by the image buffer 22, and 2D images are to be sent to the video unit 24 and the display 25 by the reduction unit 21. Therefore, the user presses the appropriate buttons 27a, 27b to set up for 3D input and 2D output.

Let us assume that the term "frame" includes two fields, as is conventional in television systems, for example. In an interlaced television system, the data in one field (let's say the "odd field," is provided to the odd numbered lines of the television (CRT, for example), and the data in the even field is provided to the even numbered lines. Typically the image provided by the odd field is displayed by the television and immediately thereafter the image provided by the even field is displayed.

Let us also assume that the odd field of a given frame provides an image for the left eye of a 3D image and the even field of the same frame provides an image for the right eye of the 3D image. This mode of operation is referred to as interlaced images for 3D display.

2. The image buffer 22 sequentially receives respective left eye and right eye fields. The REDUCTION UNIT 21 skips alternate fields, e.g., it only will use the right eye fields and will not use the left eye fields. The "not used" fields effectively are skipped, ignored, etc. Therefore, the vertical resolution of the output image provided to the video unit 24 and display 25 would be halved because half of the fields are being skipped. Therefore, the reduction unit 21 will add new fields that are SYNTHESIZED from the respective sequential ones of the "used" fields. The new fields are obtained by a "de-interlacing" process, as follows:

2a. The left eye field with lines 1, 3, 5, 7, etc., is provided to the video unit 24 and display 25.

2b. The image data from that left eye field, the odd lines in this example, is used to compute data for the even lines of the display 25. This computation is carried out on a line by line/pixel by pixel basis to obtain image data for the even lines 2, 4, 6, etc. of the display 15. Therefore, an averaging is carried out. Specifically, the respective pixels in line 1 are averaged with the corresponding pixels in line 3 to obtain image data for the pixels in line 2; and the pixels in line 3 are averaged with the pixels in line 5 to obtain image data for the pixels in line 4; and so forth to synthesize the second field for delivery to the video unit 24 and display 25. More specifically, pixel 1 in line 1 and pixel 1 in line 3 are averaged in terms of r,g,b values or Y,U,V values; and the resulting average is provided to pixel 1 in line 2. See FIG. 6 for odd field 28 and FIG. 7 for even field 29.

2c. Using the above process the even line field is prepared and is displayed subsequent to the preceding odd line field of the same frame.

2d. Subsequently the next left eye field (odd line field of the next frame) is displayed; then the next synthesized field (even line field of the same next frame) is prepared and displayed.

Note that the right eye field is unnecessary and the data pertaining to the right eye field is discarded.

The above process may be carried out discarding only one eye view, e.g., the right eye view and using only the other eye view, e.g., the left eye view to obtain sequential fields for inclusion in a given frame of a two field frame. Alternatively, the right eye view may be retained and used and the left eye view discarded.

Furthermore, although the above process of converting 3D format images to 2D images uses as an example a frame that includes two fields in which one field provides a left eye image and the other field provides the right eye image, it will be appreciated that the process may be carried out using sequential images that are not necessarily provided in respective fields of a frame. Moreover, although the 3D to 2D process was described with respect to an interlaced format in which the frame is composed of one field provided by odd lines of the frame and the other field provided by the even lines of the frame, it will be appreciated that other types of formats may be used in connection with the process wherein the 3D image data is stored in over/under format, side by side format, page flip format, sequential format or some other format.

Hard Cut Detection and Compensation In a 2D to 3D Display System

A hard cut is an immediate change in a scene. For example, assume that a scene in a movie or video shows a close-up of a person's face, and then the scene immediately switches to an outdoor view of a forest. The change in scene can happen from one image (for example, from image $X^1$ to the next image $X^0$). Since the two images are quite different, the similarity factor $d_L$ will show a great difference, and this would tend to cause the approximation variable alpha $\alpha$ to grow very large, which is undesirable because it is not accurately reflective of motion information or depth information ($3^{rd}$ dimension for stereo images).

The present invention detects when the similarity value $d_L$ exceeds a predetermined threshold value; such detection is considered to represent a hard cut. (See the Introduction section above and the section below entitled 2D To 3D Conversion Using Approximation Variable $\alpha$ for further description of the similarity value $d_L$ and its use.) Upon detecting that the similarity value $d_L$ has exceeded the predetermined threshold value, the invention resets the approximation variable alpha $\alpha$ to a value, generally a value or possibly zero, that causes the next two (or more) images, e.g., the $X^0$ and the synthesized image in the 2D to 3D conversion method, which is described elsewhere herein, to provide in effect an image with a low level of 3D depth or a 2D image (an image with low parallax). Thus, the left and right eye images would be the same or nearly the same. If the approximation variable $\alpha$ were not set to a predetermined value upon such hard cut detection, $\alpha$ might tend to achieve a level that would be representative of large or fast motion due to dissimilarity between the two images at the hard cut. This would present an inaccurate indication of depth (third dimension) and also would cause an unsatisfactory or uncomfortable view for the viewer. It is noted that although hard cut detection is described here as being detected when the similarity value $d_L$ is such as to indicate a large disparity between two sequential images of a first image sequence, such hard cut detection may be based on more than two images. Also, the approximation variable $\alpha$ may be set to a predetermined value immediately upon the detection of the occurrence of a hard cut, or it may be set step-wise over time, such as over the time during which several images are prepared for display or the time during which several images are displayed, to provide a more gradual or smooth transition.

As an example, by setting the approximation variable to the indicated value upon detecting occurrence of a hard cut, e.g., setting $\alpha$ to zero, there would be no difference between the left and right eye images for the next pair of sequential image images, so the image is seen in 2D for those two images.

However, after displaying the pair of sequential images respectively to the left and right eyes of the viewer immediately following the hard cut having been detected and the approximation variable $\alpha$ having been set to the predetermined value, e.g., zero (0) or a value yielding small degree of parallax, thereafter the approximation variable $\alpha$ is allowed to adjust automatically as is described elsewhere herein. Therefore, as the images of the first sequence of images are received and are displayed and as the images of the second sequence of images are synthesized and displayed interspersed with the images of the first sequence of images, 3D images again are displayed and may be seen by the viewer via the shutter glasses. Such adjustment of the approximation variable $\alpha$ may occur in several different ways that are described just below.

The approximation variable $\alpha$ may simply be allowed to adjust automatically, as is described in the Introduction and in the 2D To 3D Conversion sections below. Alternatively, the approximation variable $\alpha$ may be allowed to adjust as just indicated, except that the change in the approximation variable $\alpha$ may be regulated, e.g., in increments of 0.1, 0.2, 0.5, 0.75, or some other amount or functional relationship, until it reaches a target value, such as that computed per the description in the 2D To 3D Conversion section below. As a still further alternative, the prior value of the approximation variable $\alpha$ that existed just prior to the detecting of the hard cut, i.e., before it is set to the predetermined value, could be stored; and the approximation variable $\alpha$ could be allowed to increase toward that prior value until it were to reach that (target) value or near that value or some other value—thereafter, the approximation variable $\alpha$ would be allowed to adjust automatically, as is described in the 2D To 3D Conversion section below. In any event, regulating the rate of change and target goal for the approximation variable $\alpha$ tends to provide a smooth transition to the increased value thereof and also will provide for a smoother return of the actually viewed images by an observer to 3D viewed format as compared to an instantaneous rather large increase or jump to 3D. As the approximation variable $\alpha$ changes, the apparent depth of the 3D images gradually but rapidly changes to the desired depth determined by the target value of the approximation variable. This provides a more pleasant, comfortable, less tiring viewing experience.

Figure 8:
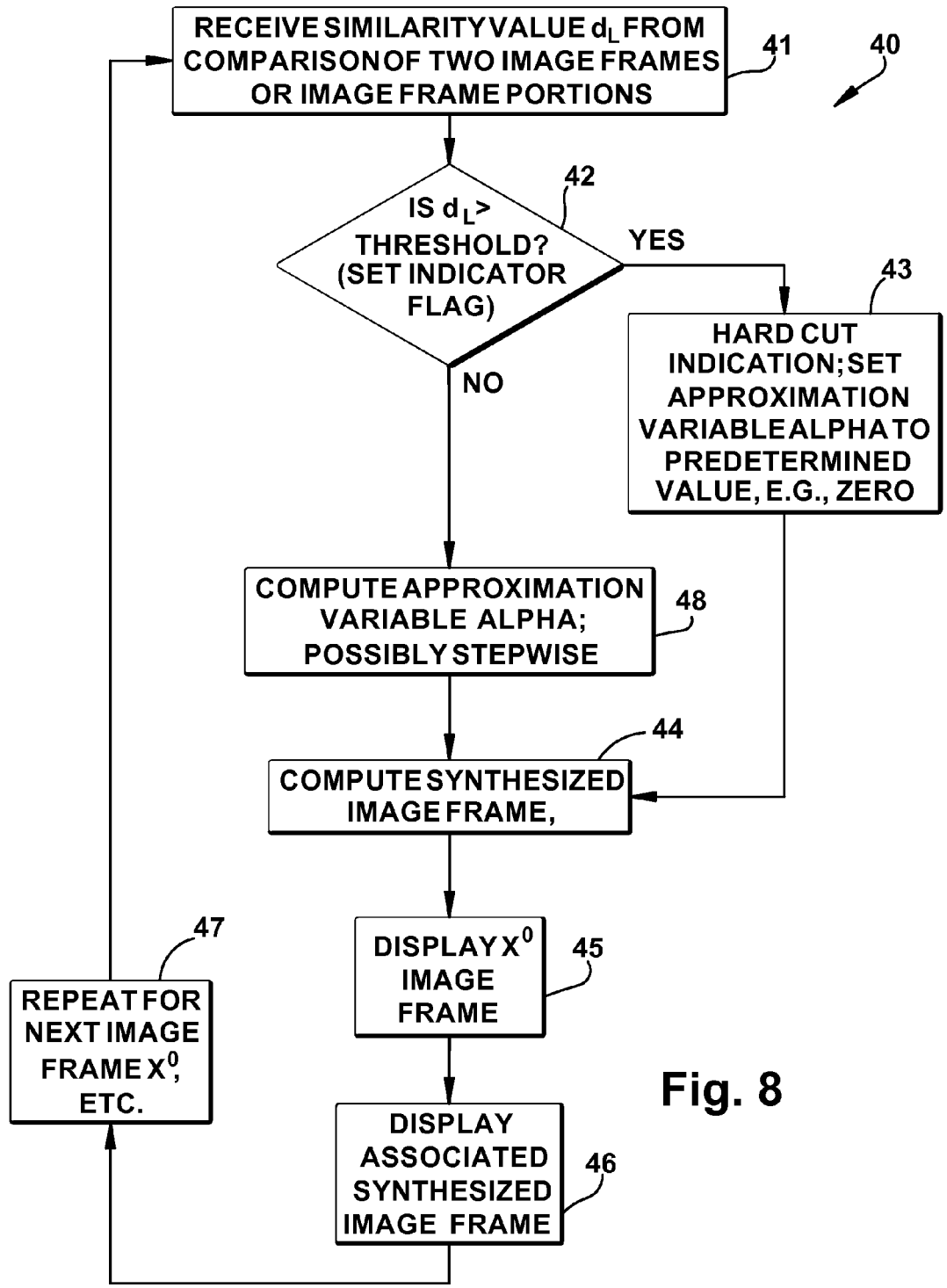
FIG. 8 is a block flow chart diagram representing an example of a process for hard cut detection and compensation.

Turning to FIG. 8, a flow chart 40 indicating the method associated with detecting the occurrence of hard cut is illustrated. At block 41 a similarity value $d_L$ is received from comparison of two images (or more than two images) in a sequence of images or from portions of two images. At block 42 a comparison is made to determine whether the similarity value exceeds a threshold. If yes, then this indicates occurrence of a hard cut, and at block 43 the approximation variable α (alpha) is set to a predetermined value, e.g., zero or a value, as to provide a 2D or limited 3D viewing experience and then a gradual increase back to full 3D viewing experience, as was described above. Also, at block 43, if desired, the value of the approximation variable α prior to resetting may be stored for possible use in connection with the automatic adjusting of the value of the approximation variable α, as was mentioned above. At block 44 the next synthesized image is computed using the then existing value of the approximation variable α, as is described in the 2D To 3D Conversion section below. The $X^0$ image then is displayed at block 45, and then the associated synthesized image that had been computed is displayed at block 46.

A loop 47 then is followed back to block 41 via block 47 calling for repeating the foregoing for the next image frame $X^0$.

If at block 42 the similarity value $d_L$ is less than the threshold (or equal to it), the approximation variable α is computed at block 48. If a hard cut had not been detected at block 42, then the computation of the approximation variable α may be as is described in the 2D To 3D Conversion section below. However, if a hard cut had been detected at block 42, then a flag may be set so that when the computing occurs at block 48 the change in the approximation variable α may be regulated until it reaches the prior value that had been stored, other target value or a substantially stable value, e.g., on account of the computing no longer calling for any changes in the approximation variable α for the next image or several of them, as may be desired to be set by the user.

The computing of the approximation variable α also is described in the immediately following section, which also may apply in the method of the instant hard cut section and be considered a part of the description just above.

Figures 9A, 9B:
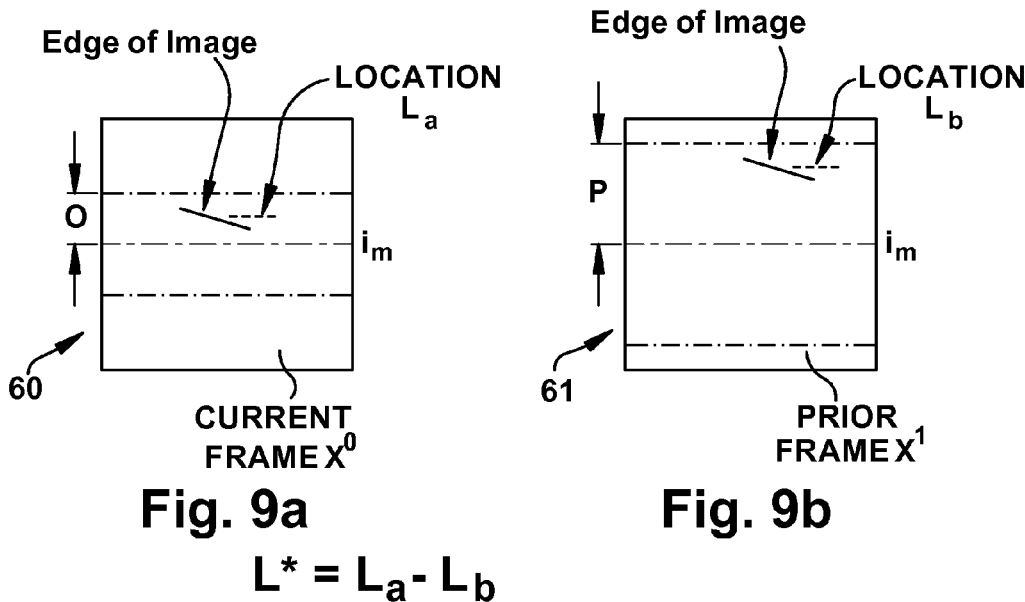
FIGS. 9a and 9b are schematic illustrations of images or image frames showing respective image portions or subframes used to determine whether there is vertical disparity or vertical motion.
Figure 10:
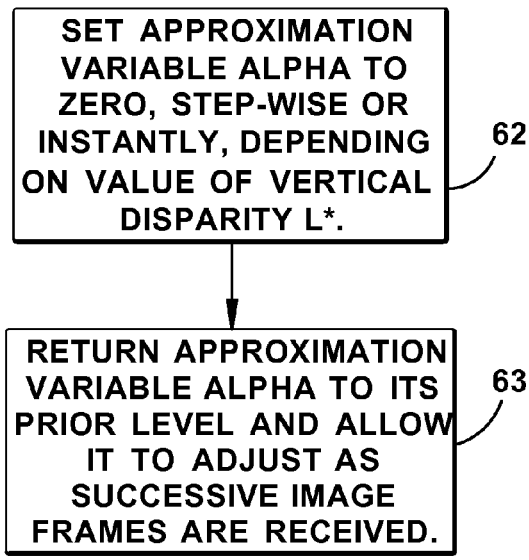
FIGS. 10 and 11 are block flow chart diagrams representing an example of a process for detecting and compensating for vertical disparity.
Figure 11:
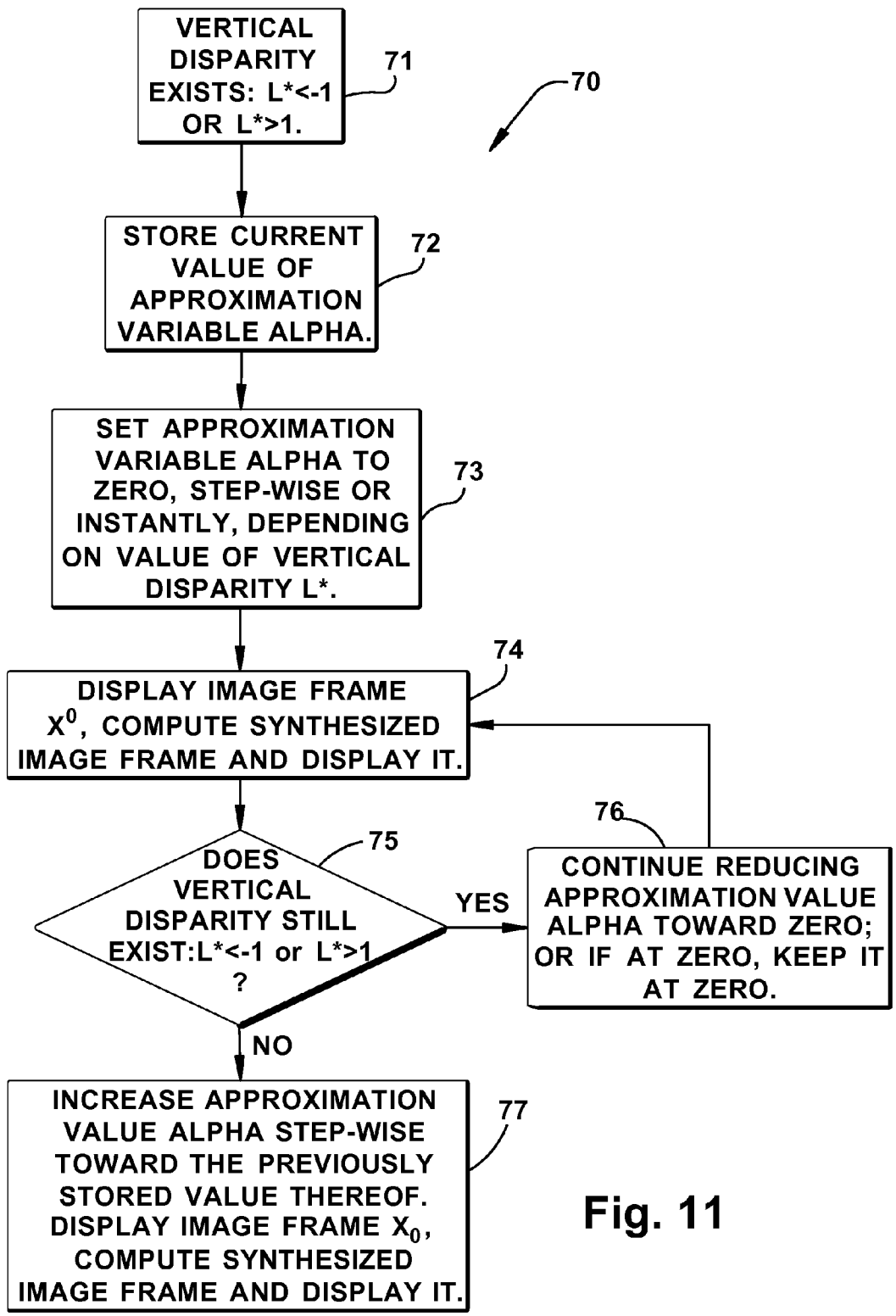

Elimination of Vertical Motion Effect in Converting from 2D to 3D in a 2D to 3D Display System See FIGS. 9-11.

The occurrence of vertical disparity between two image frames is undesirable both because it creates in a sense an artificial astigmatism (one eye sees the image vertically displaced from the other) and also because the sensing of vertical motion possibly could cause an undesirable tendency to increase the approximation variable alpha α and, thus, incorrectly cause an improper synthesized image.

Therefore, this feature of the invention is to detect vertical motion, i.e., vertical disparity L* between two similar portions of the images in successive image frames and to compensate for that vertical motion by reducing the approximation variable alpha α.

The invention detects vertical disparity L* in a way similar to that described in the Introduction above and also in the 2D To 3D Conversion Section below for detecting motion by detecting horizontal disparity between successive image frames using the areas of greatest similarity in the successive image frames.

Referring to FIGS. 9a and 9b, rather than simply using areas of greatest similarity in successive frames, the present invention looks for respective edges of objects shown in the successive image frames or in sub-frame or sub-image portions O and P centered on the horizontal image midpoint line or centerline $i_m$ of the successive image frames $X^0$ and $X^1$, for example, that are shown at 60 and 61. Assume, for example, that the edges are those of a the eaves of a roof of a house; in one image frame the edge line of the eaves is at one vertical location $L_a$ in the image frame and in the prior image frame the edge line of the eaves is at a different vertical location $L_b$ in the image frame. The relative locations could be determined by making a comparison similar to the comparison made with the image portions M and N described above in the Introduction and in the 2D To 3D Conversion section; but now the comparison is made using horizontal swaths (image frame portions) O and P across the respective image frames, as is illustrated in FIGS. 9a and 9b. The relative locations could be found by comparing the entire extent of the eaves line or corresponding portions of the eaves lines in the respective frames $X^0$ and $X^1$.

The vertical disparity between two successive image frames will be designated L* for this discussion. Thus, L* is defined as the difference between $L_a$ and $L_b$. If the vertical disparity L* does not exceed a predetermined value or threshold, for example, a value of plus or minus 1, then we can assume that there is no significant vertical disparity. (Exceeding the threshold means larger than plus 1 or smaller than minus 1 in this example.) Therefore, there is no adjustment made of the approximation variable alpha. Such threshold value may represent one or more horizontal lines of an exemplary display or image data to be displayed, if desired. The threshold value may be other than plus or minus 1, e.g., it may be more positive, more negative, or both, e.g., the absolute value may be larger or smaller than 1.

However, if the vertical disparity L* exceeds plus or minus 1, then we can assume that there is some vertical disparity, and the extent of the vertical disparity would be generally proportional to the value of L*.

Referring to FIG. 10, at block 62 if there is vertical disparity L* greater than a predetermined threshold (e.g., smaller than minus 1 or greater than plus 1), then the approximation variable alpha α is set to a predetermined value, e.g., zero (or some other value), either instantly or step-wise. This results in the viewer seeing in effect a 2D image or a low parallax image for at least a moment or longer. At block 63, after such vertical disparity greater than the threshold no longer exists, the approximation variable alpha is allowed to be adjusted, i.e., to vary as is described, for example, in the previous section and below.

Referring to FIG. 11, where the method 70 of FIG. 10 is shown in greater detail, at block 71 assume there is vertical disparity L* greater than plus or minus 1. Therefore, the invention intends to reduce the magnitude of the approximation variable alpha α. This reduction may occur over the occurrence of several image frames, say 3 to 5 image frames, whereby the approximation variable alpha α is decreased from its current value to, for example, zero, in steps that are proportional to its initial value when the vertical disparity was detected divided by the number of frames over which it is being reduced. Thus, for example, if the value of the approximation variable alpha α were 2.5 and it is to be reduced to zero over 5 image frames, each step would be 0.5.

As the approximation variable alpha α moves toward zero, the difference between the image frame $X^0$ and the synthesized image (see the 2D To 3D Conversion section below) would be reduced so that the 3D effect or stereo appearance of the images as viewed through shutter glasses, for example, would be reduced to reduce the depth effect. If the approximation variable alpha α were zero, the viewer would see a 2D image.

Another aspect of this invention is the changing of the number of steps (number of image frames) over which the approximation variable alpha α is reduced to zero depending on the magnitude of the vertical disparity L*. Therefore, if the vertical disparity L* is relatively small (i.e., larger or smaller than plus or minus 1, but not, for example, 7, then the approximation variable alpha α would be reduced over, for example, an interval of five images, i.e., in five steps. However, if the vertical disparity L* were relatively larger or smaller than plus or minus 1, for example if it were 4, then the rate at which the approximation variable alpha α would be reduced would be much quicker, for example, over two images (2 steps) or even immediately.

After reaching zero or other target value, the approximation variable alpha α would be kept at the target value until the vertical disparity L* would revert to a number between plus and minus 1.

Now, consider, how does the approximation variable alpha α would grow or alter after the vertical disparity had reverted to below the threshold. It is undesirable for the approximation variable alpha α to revert to a large value instantaneously because that would cause a jerky image going from 2D or a low parallax image to an large depth 3D image (high parallax image), for example, that would be unpleasant for the viewer to see.

Referring to FIG. 11, a flow chart 70 is illustrated. Vertical disparity L* smaller than minus 1 or greater than plus 1 is detected as existing at block 71. Therefore, the current value of the approximation variable alpha α is stored at block 72. Thereafter, at block 73 the approximation variable alpha α is set step-wise to zero or other target value (e.g., over a number of frames, the number depending on the magnitude of the vertical disparity L*) or, if the magnitude of the vertical disparity L* is large, e.g., exceeds some predetermined value, then the approximation variable alpha α immediately is set to the target value or zero.

At block 74 the image $X^0$ is displayed and the next synthesized image is computed and displayed. The display of those images is coordinated with the shutter glasses so one eye sees image $X^0$ and the other eye sees the synthesized image.

An inquiry is made at block 75 whether the vertical disparity L* exceeding the threshold still exists; if yes, then at block 76 the approximation variable alpha α continues being reduced or is kept at a target value, and at block 74 the next image $X^0$ and the associated synthesized image are displayed, and so on.

However, if the vertical disparity L* no longer exceeds the threshold (block 75), then the approximation variable alpha α is increased toward the previously stored value or other target value thereof until it reaches that value. The occurrence of each of those increases corresponds to the display of an image $X^0$ and the immediately following synthesized image. The magnitude of each increase can be set by the user or can be determined by the system of the invention, e.g., a stepwise or some other fixed or variable step or functional increase. As the approximation variable alpha α is increased, the 3D stereo effect increases for a given sequence of images After the approximation variable alpha α has returned to the previously stored value or other target value, the approximation variable α is allowed to adjust automatically. Therefore, as the images of the first sequence of images are received and are displayed and as the images of the second sequence of images are synthesized and displayed interspersed with the images of the first sequence of images, 3D images again are displayed and may be seen by the viewer via the shutter glasses, for example.

Adjustment for Program-type (Movie or Scene Type) In 3D to 2D Conversion System

See the following chart:

| Scene Type | Pre-set Values of Parameters for 2D to 3D Conversion Software | | |
|---|---|---|---|
| | Approximation Variable alpha | Parallax | Warp |
| Action: | 2.1 | 5 | Asymmetric |
| Talk Show: | 4.3 | 6 | Asymmetric |
| Wildlife: | 6 | 4 | Tilt |
| Music Video: | 1.1 | 4 | Lenticular |

An approximation variable alpha (α) is used in the computing of synthesized images for display to one eye sequentially following the displaying of the actual image $X^0$ to the other eye, as is described elsewhere herein. The instant feature of the invention relates to a pre-setting of the approximation variable alpha α to a specific level according to the type of scene, movie, video or the like (collectively referred to as movie below) that is being displayed. Throughout adjustment processes, these initial values also are used as target values, such as for the approximation variable α in the adjustment processes described above. While the exemplary values shown in the above chart are suitable for the display of several initial images, these target values are exemplary only and other values may be equally or better suited for a given scene depending on the input data stream. Other target values may be more suitable for other types of scenes.

For example, the faster the movement typically found in the movie, the smaller the value of approximation variable alpha α ordinarily would be. Therefore, if a scene in a movie had more or faster action, the value of approximation variable alpha α would automatically tend to be reduced by the 2D to 3D conversion software used in the invention, as was briefly described in the Introduction (above) and in the 2D To 3D Conversion section (below); likewise as motion slows, the value of approximation variable alpha α would tend to increase.

In accordance with the instant feature or aspect of the present invention the user may pre-select the type of movie that is going to be watched, such as, for example, an action movie, talk show, wildlife movie, or music video. As usually is the case, action movies and music videos have relatively fast action in the various scenes thereof. Therefore, the approximation variable alpha α would tend to be relatively small. Also, in the case of television talk shows and wildlife movies (in which an animal is watched for a while) the amount of motion is relatively slow in the various scenes; and, therefore, the value of approximation variable alpha α would tend to be relatively large.

The present invention allows the user to pre-select the type of movie that is going to be watched. Such pre-selection sets an initial value for approximation variable alpha α. It also may set an initial value for parallax and warp, and these parameters and the approximation variable α may be set and used in the 2D to 3D conversion process described in the Introduction and in the section below. The approximation variable α, parallax and warp parameters are described in the U.S., German and two PCT patent applications described above at the beginning of this patent application. I do not describe the details of parallax or of warp; suffice it to say here that they are parameters that may be set and used in the 2D to 3D conversion software.

Such setting is shown by respective inputs 80-82 to the conversion unit 23 in the system 20 of FIG. 5. Accordingly, the conversion unit may be used to provide those settings to the video unit 24. After the approximation variable alpha α is pre-set according to the type of movie that will be watched, the approximation variable alpha (α) may be adjusted automatically according to the actual motion that is detected, as is described elsewhere herein.

The other parameters, e.g., parallax, warp, and/or others, similarly could be pre-set according to the type of movie. Also, as was described with respect to the approximation variable alpha (α), one or more of such other parameters may adjust automatically and/or may be set to a prescribed value in response to detection of a given occurrence, such as a hard cut, vertical motion, etc.

2D to 3D Conversion Using Approximation Variable α

This section is referred to by the above sections as the 2D To 3D Conversion section. In this section the symbol Ø is used to represent a zero (0) value to try to avoid conflicting with the letter "o" that is used in several of the variables, formulas, etc.

Figure 12:
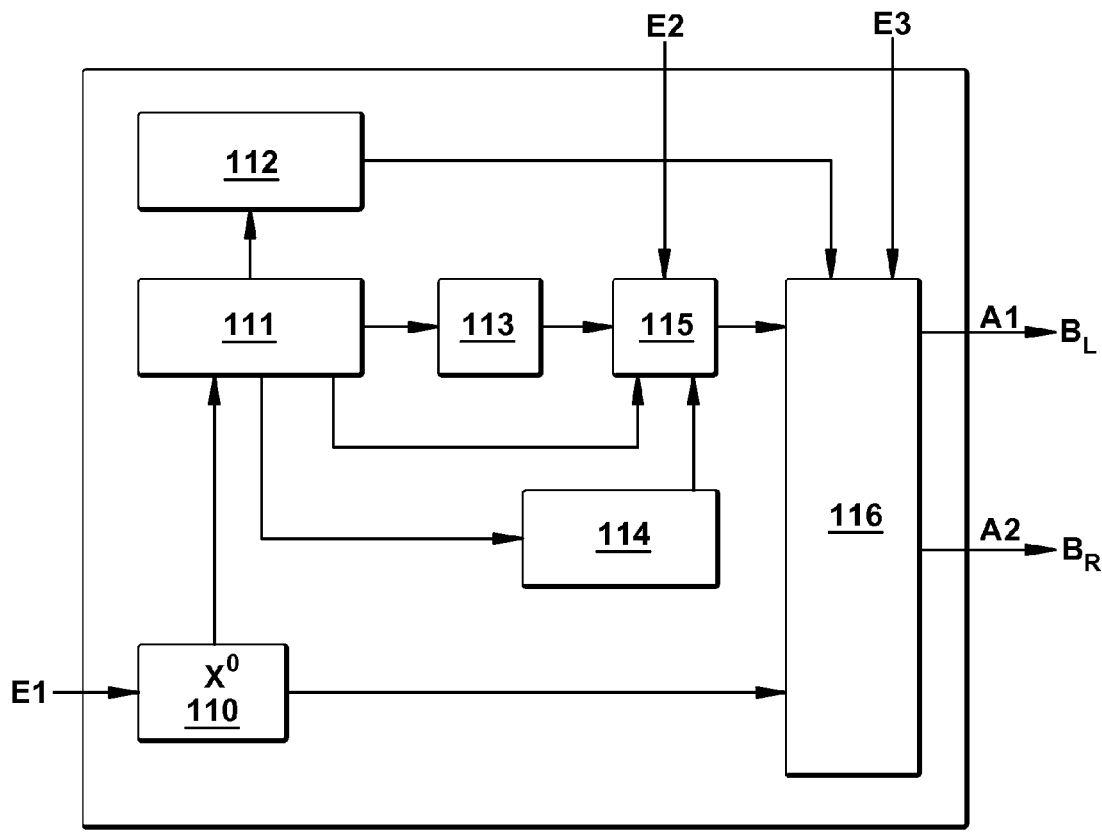
FIG. 12 is a schematic block diagram of circuitry according to the invention.

The basic components of a device according to the invention and their interconnections are schematically represented in FIG. 12. The system comprises a first input E1, through which the two-dimensional images generated by a camera and transmitted across a transmission path are directed to an A/D converter 110 and digitized. The digitized images are then directed to an image storage device 111 and a phase selector 116. The phase selector determines whether the average motion in the image sequence is going to the left or right. The images saved in the image storage device 111 are analyzed by a phase analyzer 112, the input of which is connected to the image storage device 111, and the output of which is connected to the phase selector 116. The phase analyser 112 analyzes whether the average motion is going to the left or right; based on that analysis or information the phase selector 116 determines whether the image goes to (is directed to) the right eye or to the left eye. In addition, a long-term storage device 113 is connected to the image storage device 111 for storing images from this storage device and the output of which is connected to an image generator 115.

Furthermore, the image generator 115 is also connected to another output of the image storage device 111 and of a motion analyzer 114, to which images from the image storage device 111 are directed. In addition, the device comprises a second input E2 for manual motion control connected to the image generator 115, as well as a third input E3 for manual phase control attached to the phase selector 161. The manual motion control may be operated to select or to toggle between stereo and inverse stereo (also sometimes referred to as pseudo stereo). A right or left stereo image $B_L$, $B_R$ is attached to two outputs of the phase selector 116, which are connected to a first or second output A1, A2 of the device. These outputs A1, A2 may be coupled to a computer display, monitor, television, projector or any other display to provide respective images.

A second image sequence is generated by this device based on a (first) image sequence recorded in two-dimensions. Together with the first image sequence, the second sequence makes it possible to view the originally two-dimensional images in three dimensions when the first and second image sequences are transmitted to the left or right eye. The second image sequence is defined according to the following description based on image information resulting from the motion in the first image sequence. The following definitions apply:

$X_{ij}$ is a digitized image at time t with vertical resolution I and horizontal resolution J. For convenience and standardization in describing the invention herein, with regard to the symbols, as used herein, upper case letters, e.g., $X_{ij}$, represent a grouping, such as, for example a digitized image that is formed by a number of pixels, and lower case letters, e.g., $x_{ij}$, represent a portion of the grouping, e.g., a pixel of the image. The scan interval is Δt, so that the following formula is defined for an image scanned at time k and saved in the image storage device 111:

$$X^k := X_{ij}(t - \Delta t \cdot k)$$

The above formula concerns an image stored in the image storage device 111. The above formula is a definition. The symbol := means "is defined as". Also, the above formula indicates that the X image that previously had been received and remains stored in the system as 1, 2, 3, ... etc. images/frames/fields ago, is defined as the image $X_{ij}$ that is a function of or has occurred at the current or immediate time t minus the scan interval Δt times the number of the $k^{th}$ time (image). "K" represents the number of images or frames that currently are stored in the system and "k" represents the number of the particular image that had been stored, e.g., one image ago, two images ago, etc. $X^0$ is defined as the current image.

The most recent K images are located in the image storage device 111 with length K. $0 \leq \alpha \leq k$ is a real number representing the time interval of a given image $X^k$, at which a (synthetic also referred to herein as "synthesized") image of the second image sequence is generated. The approximation variable, α, may be an integer, e.g., 1, 4, etc., or it may be a decimal or fraction, e.g. 0.2, 1.4, 4.3, etc. In addition, $B_L$ represents the given displayed left image and $B_R$ the given displayed right image. The letter "X" is upper case just above because it is a "given image" rather than a pixel—a pixel would be represented by the lower case letter "x."

As a non-limiting example, the number (K) of images stored in the image storage device 111 may be four or six; these would be the last (e.g., the most recent) four or six images that were stored. The number K of such images may be other than four or six. Thus, each stored image may be represented $X^1, X^2, \ldots X^6$, that is $X^k$. The respective images $X^k$ are shifted in the image storage device 111 as new images are provided.

It is assumed that a fixed initial value is given to α. The images $X^k$ in the image storage device 111 are viewed as sample values (scanned image sequence according to curve b in FIG. 13) of a constant function (actual image sequence according to curve a in FIG. 13). Various methods of approximation may be applied to this function. The following explanations relating to FIG. 13 refer to a linear spline approximation. However, other methods of approximation may be used as appropriate; for example, higher-level or polynomial approximations.

Figure 13:
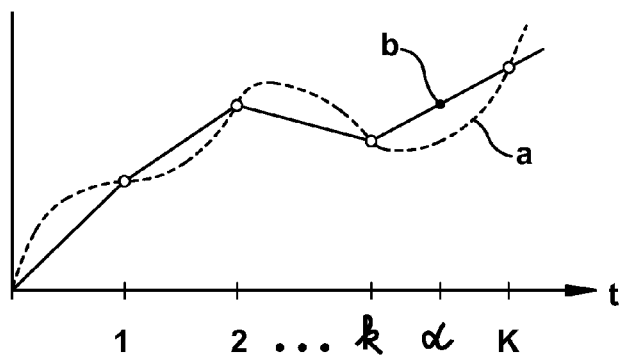
FIG. 13 is a graphical representation of an actual image sequence and of a scanned image sequence.

FIG. 13 shows an image sequence in two-dimensional (I/J-) space. The second image sequence is calculated by the image generator 15 as follows: first, $\alpha_u$ is calculated as the largest whole number (integer) which is smaller than $\alpha$. Next, $\alpha_o$ is calculated as the smallest whole number (integer) which is larger than $\alpha$. So:

$$B_L := X^\varnothing$$

$$B_R := X^{\alpha_o}(\alpha - \alpha_u) + X^{\alpha_u}(1 - \alpha + \alpha_u)$$

In the above equations the symbols $X^{**}$ actually mean the images (or image data) X that is associated with number $\alpha_o$ or number $\alpha_u$. In the symbology used herein the number zero is shown as to Ø, that is a "0" with a line through it to facilitate distinguishing the number zero from the letter "o". Also, upper case letter X is used in the respective paragraphs just above and just below since it represents an image, not a pixel. Note that the letter "o" is used in the right image equation because it represents "ober" (the German language word for more than or greater than) and where used the letter "u" means "unter" (the German language word for less than).

The image sequence $B_L$ for a left viewing channel for (left eye viewing) is calculated by the given actual images of the first image sequence $X^\varnothing$, $X^1$, etc., and the (second) image sequence $B_R$ is calculated by approximation for a right viewing channel (for right eye viewing). Note that $X^\varnothing$ is the "native" image, e.g., the one being shown or displayed at the current time or the one being readied to be shown or displayed.

This calculation is performed separately by the image generator 15 for all of the pixels $x_{ij}$ in a selected color space for examples (RGB or YUV); that is (for YUV):

$$B_R := b_{ij}^{(Y,U,V)} := \begin{array}{l} x_{ij}^{\alpha_o}(Y)(\alpha - \alpha_u) + x_{ij}^{\alpha_u}(Y)(1 - \alpha + \alpha_u), \\ x_{ij}^{\alpha_o}(U)(\alpha - \alpha_u) + x_{ij}^{\alpha_u}(U)(1 - \alpha + \alpha_u), \\ x_{ij}^{\alpha_o}(V)(\alpha - \alpha_u) + x_{ij}^{\alpha_u}(V)(1 - \alpha + \alpha_u)). \end{array}$$

$b_{ij}$ is a pixel (member) of the total image $B_R$. $b_{ij}^{(Y,U,V)}$ is calculated in YUV color space as is shown above. A similar calculation could be made for RGB color space.

RGB color space typically is used for computers; YUV color space typically is used for television. Other color space variables representing color, gray scale, etc. also may be used, as will be appreciated.

Figure 14A:
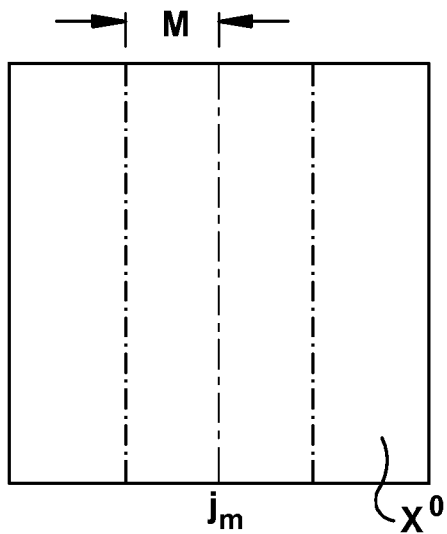
FIGS. 14a-c are schematic representations of phase control in sequential images.

In addition, automatic phase control is performed by the phase analyzer 12 to determine movements in sequential images of the first image sequence. I is the number of rows (lines) and J is the number of columns of an image or of a display in which an image is expected to be or is being shown. It is assumed that $j_m := J/2$ is the horizontal midpoint of an image along a column $j_m$, as is illustrated in FIG. 14a, so $x_{ij_m}^\varnothing$ with $\varnothing \leq i \leq I$ is the middle column of the image $X^\varnothing$ at time t. Furthermore, $M < j_m$, where M is a selected integer. Then:

$$X_{ij}^{\varnothing s} := X_{ij}^\varnothing \text{ with } \varnothing < i < I \text{ and } j_m - M < j < j_m + M$$

will be defined as a scanned image, shown in vertical stripes in FIG. 14a. The symbol "s" indicates a scanned image; it is a portion or subimage of the image $X_{ij}^\varnothing$. (Also, note that the symbol "s" here is a subscript to the Ø, e.g., as in the case of $\alpha_o$ above.) Said image comprises 2M+1 columns around the horizontal midpoint $j_m$ of the image $X^\varnothing$.

Now, N is a fixed number (since N and M represent numbers of columns, both N and M are integers) with N>M, so:

$$X_{ij}^{1s} \text{ with } \varnothing \leq i \leq I \text{ and } j_m - N \leq j \leq j_m + N$$

are defined as the search region (see FIG. 14b) in image $X^1$, in which the partial image with the greatest similarity to the scanned image $X_{ij}^{\varnothing s}$ is sought. $X_{ij}^{1s}$ ("s" is a subscript to the digit "1") is a subimage that is generated out of image $X^1$. $d_L$ is the similarity of the scanned image to a partial image of equal size from the search region with a displacement position L, where $-N \leq L \leq +N$.

If cross-correlation is chosen as a measure of similarity, $d_L$ is the result for the displacement position L: Formula (1):

$$d_L := 1 - \frac{\sum_{i=0}^{I} \sum_{j=j_m-m}^{j_m+m} |x_{ij}^\varnothing \cdot x_{i(j-1)}^1|}{\sqrt{\sum_{i=0}^{I} \sum_{j=j_m-m}^{j_m+m} (x_{ij}^\varnothing)^2 \cdot \sum_{i=0}^{I} \sum_{j=j_m-m}^{j_m+m} (x_{i(j-1)}^1)^2}}$$

Here, the value of L ranges from -N to +N, where L represents the given displacement position of a partial image in the search region.

As an alternative to cross-correlation, a Euclidean distance or an absolute amount may also be chosen as a measure of similarity.

Figure 14B:
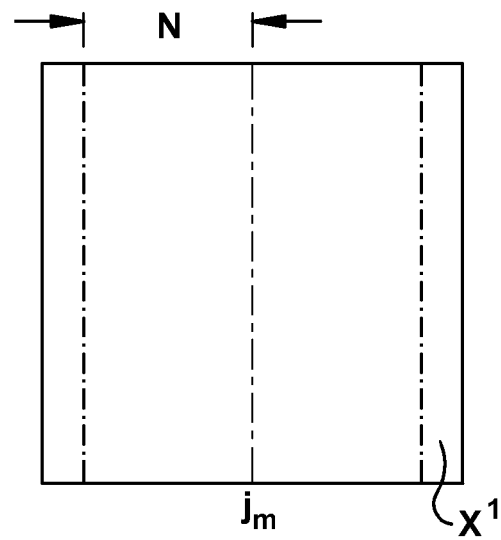

Thus, with this method, as indicated in FIGS. 14a and 14b, the scanned image $X^s$ (FIG. 14a) runs like a scanner across the search region (FIG. 14b) of the image $X^1$ (previous image) and looks for the region with the greatest similarity $d_L$ to the scanned image, where the similarity $d_L$ is calculated for every displacement position L.

Figure 14C:
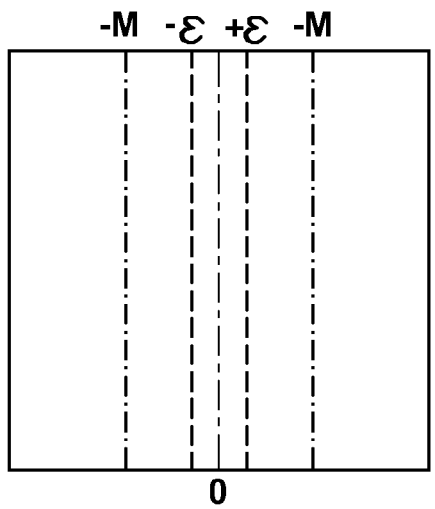

In addition, a whole number (integer) $\epsilon$ is defined, which may be called the moment of inertia and with which blurring is defined according to FIG. 14c. This is used to allow for camera movement that should not be considered displacement of the image. For the value of $\epsilon$ $-1 \leq \epsilon \leq 1$ approximately.

This analysis is performed substantially as follows. First, all measures of similarity $d_L$ for $-N \leq L \leq +N$ are calculated by the phase analyzer 12. Next, the measure of similarity $d_{min}$ is chosen with the smallest value ($d_{min} := \min d_L$) and the index $I_{min}$ of this measure of similarity is determined. ($I_{min}$ is the position where the most (greatest) similarity exists; as an example only, $I_{min}$ may be five columns to the left or to the right.) The values $I_{min}$ and $\epsilon$ are compared by the phase selector 116, and the phase selector 116 switches as a function of the results of the comparison as follows:

If $I_{min} < \epsilon$, this means that the region of greatest similarity in the search region is displaced to the left, and thus the predominant direction of movement in sequential images $X^1$, $X^\varnothing$ of the first image sequence is indicated from left to right. ($X^\varnothing$ is the current image, and $X^1$ is the immediate prior image.) This may result from the movement of an object in the images from left to right or from the panning of the camera from right to left (sometimes referred to as moving, trucking or other motion of the camera). In this case, for the left image $B_L := X^\varnothing$ (i.e., the given image of the image sequence) and a calculated synthetic (sometimes referred to herein as "synthesized") image (second image sequence) is selected for the right image $B_R$. In addition, a "shift" indicator is set to "left" in the phase selector 116.

If $I_{min}>\epsilon$, this means that the region of greatest similarity in the search region is displaced to the right, and thus the predominant direction of movement in sequential images $X^1$, $X^\varnothing$ of the first image sequence is indicated from right to left. This may result from the movement of an object in the images from right to left or from the panning of the camera from left to right. In this case, a calculated synthetic image (second image sequence) is selected for the left image $B_L$ and for the right image $B_R:=X^\varnothing$ (i.e., the given image of the image sequence). In addition, the "shift" indicator is set to "right".

If $|I_{min}|<\epsilon$ and the indicator is set to "right", then a calculated synthetic image is selected for the left image $B_L$ (second image sequence) and for the right image $B_R:=X^\varnothing$ (i.e., the given image of the image sequence). Finally, if $|I_{min}|<\epsilon$ and the indicator is set to "left", then for the left image $B_L:=X^\varnothing$ and a calculated synthetic image is selected for the right image (second image sequence).

The next image is then accessed (e.g., digitized) and the same process is repeated for this image, beginning with the calculation of the location of a maximum degree of similarity.

This automatic phase control or selection may also be switched off and, for example, replaced by manual switching using a keyboard, or remote, or icons, via the device's third input.

Furthermore, the embodiment shown in FIG. 12 comprises the motion analyzer 114, which uses dynamic motion control or motion calculation to prevent the stereo base from becoming too large when there are large movements. In addition, this ensures that a certain minimum width of the stereo base is maintained during very slow movements before it disappears in images without any motion. The long-term storage device 113, from which images are accessed and used as images of the second image sequence when the movements are too slow, has been provided for this last purpose. Thus, the invention may take and use in computations an image from the long term storage device if no movement (motion) is detected between, say, adjacent (immediately sequential) images; otherwise the value for the approximation variable α would get too large. The measure of similarity $\delta_k$ at time $t_k$ is defined as follows: Formula (2):

$$\delta_k := 1 - \frac{\sum_{i=0}^{I}\sum_{j=0}^{J}|x_{ij}^k \cdot x_{ij}^{k+1}|}{\sqrt{\sum_{i=0}^{I}\sum_{j=0}^{J}(x_{ij}^k)^2 \cdot \sum_{i=0}^{I}\sum_{j=0}^{J}(x_{ij}^{k+1})^2}}$$

Therefore, this measure of similarity is a function of the extent to which the entire contents of the next image in an image sequence differ from the contents of the previous image, and thus represents a measure of the speed of motion in the images.

Threshold values $\delta_0<\delta_1<\delta_2$ are defined for the analysis of said measure of similarity, where in the ideal case the measure of similarity $\delta_k=0$ for an unchanged (constant) image at time $t_k$ in comparison to the previous image at time $t_{k+1}$. The values of the "deltas" may be arbitrary. However, because there is always a certain amount of background noise during digitization, it should be assumed that $\delta_k<\delta_0$ for an unchanged image.

A Euclidean distance or an absolute amount may of course be chosen for the calculation instead of the cross-correlation described. The individual color values of the selected color space RGB or YUV must always be processed separately.

To analyze the value of the measure of similarity $\delta_k$ (k=0, 1, . . . K), it is first stored in the motion analyzer 114 and then compared to the threshold values.

If $\delta_k<\delta_0$, this means that the movements in the sequential images are very slow or nil. In this case, the transfer of the values of $X^k$ to the long-term storage device 113 is stopped so that images will be available which have a sufficient motion differential. In addition, images stored in the long-term memory device are used to generate the second image sequence in order to maintain the minimum stereo base width, for example, the difference between two images as viewed by a viewer (person), such as sixty-five millimeters distance between the viewer's eyes as but one example.

In order to rapidly set the best value of the approximation value, it is advantageous to know whether the motion is increasing (speeding up) or decreasing (slowing). If $\delta_k>\delta_0$, the value of the approximation variables α will change as a function of the size of the measure of similarity $\delta_k$ relative to the threshold values $\delta_0$, $\delta_1$, $\delta_2$, as follows. The objective is to increase or to decrease the value of the approximation variable α as may be appropriate.

If $\delta_0<\delta_k<\delta_2$ and $\delta_k-\delta_{k-1}\leq\delta_1$ and as long as $\alpha\leq K-s$, then the approximation variable is set at $\alpha:=\alpha+s$. ("s" is defined below.)

If $\delta_0<\delta_k<\delta_2$ and $\delta_k-\delta_{k-1}\leq\delta_1$ and as long as $\alpha\leq s$, then the approximation variable is set at $\alpha:=\alpha-s$. Ordinarily it is undesirable for α to equal s, because that would bring α to zero, and then the left and right images would be the same (producing a 2D image).

The character "s" denotes a step width which may be 0.1, however, it can have other values as well such as, for example, 0.5, 0.75 or another calculated value.

If $\delta_0<\delta_k<\delta_2$ and $-\delta_1<\delta_k-\delta_{k-1}<\delta_1$, then the approximation variable will remain at $\alpha:=\alpha$ because the motion velocity is substantially constant. In this case, no adjustment is necessary. In this case there is no adjustment to α but there is constant motion, for example.

Finally, if $\delta_2<\delta_k$, this means that the movement is very fast and the stereo base width would be too large. In this case, the approximation variable may be set at $\alpha:=s$ times $\delta_2/\delta_k$.

This dynamic motion control can also be switched off like the automatic phase control and replaced by manual entry; for example, using a keyboard via the device's second input.

The method described will preferably be implemented using a data processing program on a computer, in particular a digital image processing system for the generation of a three-dimensional depiction of television pictures transmitted or stored in a two-dimensional format. Reference herein to television means, for example, broadcast signals, video, signals, DVD, CD and/or tape recorded signals or other signals representing respective images or image information. Also, reference herein to image or images may refer to image data for use ultimately in providing an image for display or to a display device, such as a computer monitor, television, etc., as will be evident from the context of the description.

In the following, an example with specific values shall be given for the above embodiment. In case of application of the known PAL standard the vertical resolution is I=576 and the horizontal resolution is J=768, whereas for the NTSC standard, I=480 and J=640 are prescribed.

Generally it is sufficient to store the last five images in the image storage device 111 which means K.:≦5. As an initial value $\alpha_o$, the approximation variable is set to $\alpha_o:=2.1$. For an adequate analysis of motion in sequential images the value of M is set to 1 or 2. The value of N should be chosen such that even in case of fast motions the scanning image is still within the search region. For this, a value of N of $20 \leq N \leq 30$ (for example, N:=25) is adequate. However, the value of N can as well comprise the complete original image so that N:=J/2.

For defining the blurring, a value of $\epsilon:=1$ is proposed whereas for evaluating the measure of similarity the following values for the threshold values are preferably chosen: $\delta_0:=0.05$, $\delta_1:=0.6$ and $\delta_2:=0.8$.

With an embodiment realized with these values a very natural three-dimensional reproduction could be obtained for image sequences with very differently moving contents.

Figure 15:
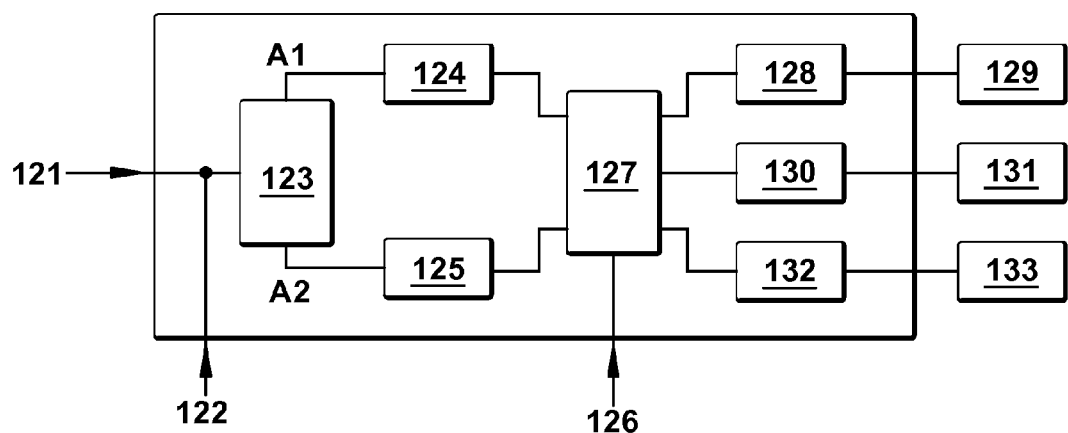
FIG. 15 is a schematic block diagram of one imaging application of the invented device.

Finally, FIG. 15 shows a block diagram of a device for the generation and depiction of 3-D images which are calculated based on a sequence of 2-D images transmitted over a transmission path or accessed from a storage medium.

The device comprises a first input 121, to which the 2-D images transmitted across a transmission path and demodulated or decompressed according to known techniques are connected. In addition, there is a second input 122, which is connected to a DVD player, a video recorder, or another source of images, for example.

Both of these inputs are connected to the invented device 123 according to FIG. 15, with which 3-D images are calculated based on the sequence of 2-D images according to the detailed explanation above. The outputs A1, A2 of this device, to which a sequence of left or right images $B_L$, $B_R$ is connected, are connected to a stereo storage device 124, 125, in which the images are stored for each channel.

Finally, different driver levels (these could be software driven or hardware driven) can be selected via a third input 126 by activating a selector switch 127, by means of which a corresponding image generator is controlled. For example, a driver 128 for simulator goggles 129 (also known as "shutter glasses"), a driver 130 for an autostereoscopic monitor 131, and a driver 132 for a stereo projector 133 are shown here.

This device is preferably part of a digital image processing system for viewing 3D images from generated or stored 2D images.

Although the invention has been shown and described with respect to certain illustrated embodiments, equivalent alterations and modifications will occur to others skilled in the art upon reading and understanding the specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function (i.e., that is functionally equivalent), even though not structurally equivalent to the disclosed structure which performs the function in the herein illustrated embodiments of the invention. In addition, while a particular feature of the invention may have been described above with respect to only one of several illustrated embodiments, such a feature may be combined with one or more other features of the other embodiment, as maybe desired and advantageous for any given or particular application.

The invention claimed is:

1. A method for generating 3D images using parallax, comprising:
   providing a first sequence of images for display,
   computing a second sequence of synthesized images for display by approximation from one or more images of the first sequence using an approximation variable representative of a relationship between at least two images of the first sequence,
   allowing the approximation variable to change in response to a relationship between at least two images of the first sequence,
   checking for occurrence of a hard cut between images of the first sequence, and
   in response to occurrence of a hard cut, setting the approximation variable to a value that provides a low non-zero degree of parallax between the respective images of the first and second sequences of images.

2. The method of claim 1, further comprising displaying sequentially in alternating relation respective images of the first sequence and respective images of the second sequence to provide 3D images when there is no occurrence of hard cut.

3. The method of claim 2, further comprising detecting a hard cut as two successive substantially different images of the first sequence.

4. The method of claim 2, further comprising examining successive images of the first sequence to determine the extent of similarity thereof, and detecting occurrence of a hard cut when the difference between such successive images exceeds a threshold.

5. Apparatus for generating 3D images using parallax, comprising
   means for providing a first sequence of images for display,
   means for computing a second sequence of synthesized images for display by approximation from one or more images of the first sequence using an approximation variable representative of a relationship between at least two images of the first sequence and allowing the approximation variable to change in response to a relationship between at least two images of the first sequence,
   means for checking for occurrence of a hard cut between images of the first sequence, and
   means operative in response to occurrence of a hard cut for setting the approximation variable to a value that provides a low non-zero degree of parallax between the respective images of the first and second sequences of images.

* * * * *